United States Patent
Luo et al.

(10) Patent No.: US 12,168,978 B2
(45) Date of Patent: Dec. 17, 2024

(54) PUMP UNIT FOR MINIATURE CLEANING MACHINE

(71) Applicant: LUTIAN MACHINERY CO., LTD., Zhejiang (CN)

(72) Inventors: Changguo Luo, Zhejiang (CN); Yubo Chen, Zhejiang (CN); Yongsheng Zhao, Zhejiang (CN)

(73) Assignee: LUTIAN MACHINERY CO., LTD., Zhejiang (CN)

( * ) Notice: Subject to any disclaimer, the term of this patent is extended or adjusted under 35 U.S.C. 154(b) by 199 days.

(21) Appl. No.: 17/912,649

(22) PCT Filed: Nov. 8, 2021

(86) PCT No.: PCT/CN2021/129404
§ 371 (c)(1),
(2) Date: Sep. 19, 2022

(87) PCT Pub. No.: WO2022/188447
PCT Pub. Date: Sep. 15, 2022

(65) Prior Publication Data
US 2023/0134911 A1 May 4, 2023

(30) Foreign Application Priority Data

Mar. 9, 2021 (CN) .......................... 202120503854.7

(51) Int. Cl.
*F04B 17/03* (2006.01)
*B08B 3/02* (2006.01)
*F04B 9/04* (2006.01)

(52) U.S. Cl.
CPC .............. *F04B 9/045* (2013.01); *B08B 3/028* (2013.01); *F04B 17/03* (2013.01)

(58) Field of Classification Search
CPC ................... F04B 17/03; F04B 7/0266; F04B 9/04–045; B08B 3/028; B08B 2203/027
(Continued)

(56) References Cited

U.S. PATENT DOCUMENTS

| | | | | |
|---|---|---|---|---|
| 5,207,771 A | * | 5/1993 | Sugisaw | F04B 9/045 92/72 |
| 5,354,183 A | * | 10/1994 | Eisenbacher | F04B 53/08 417/273 |
| 6,238,189 B1 | * | 5/2001 | Guentert | F02M 59/06 417/454 |

(Continued)

FOREIGN PATENT DOCUMENTS

| CN | 201043514 Y | 4/2008 |
|---|---|---|
| CN | 209687668 U | 11/2019 |

(Continued)

OTHER PUBLICATIONS

International Search Report issued by ISA/CN in connection with PCT/CN2021/129404 on Jan. 26, 2022.

*Primary Examiner* — Thomas Fink
(74) *Attorney, Agent, or Firm* — Levenfeld Pearlstein, LLC

(57) ABSTRACT

The invention provides a pump unit for a miniature cleaning machine, and belongs to the technical field of cleaning machines. The problem that an existing pump unit is frequently maintained is solved. The pump unit for the miniature cleaning machine comprises a motor, a pump shell, a plunger and a transmission assembly, the plunger and the transmission assembly are arranged in the pump shell, a reset spring enabling the plunger to always have the upward moving trend is arranged in the pump shell, the transmission assembly comprises a pump main shaft, an eccentric shaft and a ball bearing, one end of the pump main shaft is in transmission connection with the motor, and the other end of the pump main shaft is in transmission connection with the eccentric shaft. The other end of the pump main shaft is in (Continued)

transmission connection with one end of the eccentric shaft, the other end of the eccentric shaft is connected to the pump shell, the eccentric shaft is sleeved with the ball bearing, and a peripheral face of the ball bearing is attached to an upper end face of the plunger. The structure solves the problem of frequent maintenance of the pump unit.

8 Claims, 5 Drawing Sheets

(58) Field of Classification Search
USPC .................................................. 417/369–371
See application file for complete search history.

(56) References Cited

U.S. PATENT DOCUMENTS

| | | | |
|---|---|---|---|
| 7,422,421 B2 * | 9/2008 | Sakai | ...................... F04B 53/04 |
| | | | 277/514 |
| 2003/0138333 A1 | 7/2003 | Nakazawa | |
| 2003/0201347 A1 * | 10/2003 | Danielson | ............. B05B 15/652 |
| | | | 239/587.1 |
| 2004/0046044 A1 * | 3/2004 | Bennett | .................. B08B 3/026 |
| | | | 239/146 |

FOREIGN PATENT DOCUMENTS

| | | | |
|---|---|---|---|
| CN | 210660460 U | * | 6/2020 |
| CN | 210977781 U | | 7/2020 |
| CN | 212360076 U | | 1/2021 |
| CN | 212550109 U | | 2/2021 |
| CN | 214304212 U | | 9/2021 |

* cited by examiner

US 12,168,978 B2

PUMP UNIT FOR MINIATURE CLEANING MACHINE

BACKGROUND OF THE INVENTION

1. Field of the Invention

The invention relates to the field of cleaning machines, and more particularly, to a pump unit for a miniature cleaning machine.

2. Description of the Related Art

High-pressure cleaning machines are designed to clean a surface of an object by using high-pressure water generated from a high-pressure plunger pump through a power unit. The power unit may choose an electric motor, a gasoline engine, or a diesel engine. In daily life, people often need to clean balconies, walkways, outdoor tables and chairs, barbecue grills, cars, bicycles, garages and other objects. Stains such as sludge, oil stain, leaves and dust, may inevitably occur on those objects due to the fact that they are used outdoors. It is inconvenient to clean the surface with a rag. Therefore, it is desirable to spray high-pressure water jet from a miniature portable high-pressure cleaning machine on the objects for cleaning.

For example, a miniature cleaning equipment pump unit [publication No. CN212360076U] is disclosed in China Patent Network. The pump unit comprises a motor and a plunger pump driven by the motor, an output shaft of the motor is in transmission connection with a main shaft, a cam rotating along with the main shaft is arranged on the main shaft, and a plunger mechanism is arranged below the cam. The cam drives the plunger mechanism to reciprocate in the plunger cavity, a lower end of the plunger mechanism is sleeved with a reset spring, a roller bearing is hinged on an upper end of the plunger through a roller bearing pin, the roller bearing is pressed against a radial contour surface of the cam. When running, the motor drives the main shaft to rotate so as to drive the cam to rotate. Rotation of the cam causes the plunger to move up and down, and a rolling friction occurs between the roller bearing and the cam.

During the up-down reciprocating motion of the plunger, the plunger always has the upward moving trend under the action of the spring, so that a peripheral face of the needle roller bearing is attached to a peripheral face of the cam. The needle roller bearing and the cam are in a mutual extrusion state. Since a load that the needle roller bearing can bear is relatively small, long-term use of the needle roller bearing may make it more prone to be damaged and has a short service life. As a result, the needle roller bearing needs to be replaced frequently, which in turn leads to the problem of frequent maintenance of the pump unit, thus, costs for the use of the pump unit are relatively higher.

SUMMARY OF THE INVENTION

An object of the invention is to provide a pump unit for a miniature cleaning machine based on the above-mentioned problems in the prior art. The technical problem to be solved by the invention is how to solve the problem of frequent maintenance of the pump unit.

The object of the invention can be achieved by the following technical solution:

a pump unit for a miniature cleaning machine, comprising:

a motor, a pump shell, a plunger and a transmission assembly, the plunger and the transmission assembly are arranged in the pump shell, a reset spring enabling the plunger to always have the upward moving trend is arranged in the pump shell, wherein the transmission assembly comprises a pump main shaft, an eccentric shaft and a ball bearing, one end of the pump main shaft is in transmission connection with the motor, and the other end of the pump main shaft is in transmission connection with one end of the eccentric shaft, the other end of the eccentric shaft is connected to the pump shell, the eccentric shaft is sleeved with the ball bearing, and a peripheral face of the ball bearing is attached to an upper end face of the plunger.

When the pump unit operates, the motor drives the pump main shaft to rotate, so as to drive the eccentric shaft to rotate. Then the rotation of the eccentric shaft makes the ball bearing rotate. The peripheral face of the ball bearing is in rolling friction with the upper end face of the plunger, so that the plunger can reciprocate up and down. When compared with the prior art, the structure in this invention does not have the needle roller bearing arranged on the plunger, instead, the eccentric shaft is sleeved with the ball bearing, and the peripheral face of the ball bearing is directly attached to the upper end face of the plunger. Since the ball bearing can bear a larger load than the needle roller bearing does, the ball bearing is not prone to be damaged, which in turn extends the service life of the bearing, and reduces the usage costs of the pump unit; on the other hand, the ball bearing is smaller in size and lower in cost than the cam, and arrangement of the needle roller bearing on the plunger is eliminated, which further reduces the manufacturing cost of the pump unit.

In the above-mentioned pump unit for a miniature cleaning machine, one end of the pump main shaft is mounted on the pump shell through a bearing, and the end of the pump main shaft is in transmission connection with one end of the eccentric shaft; the other end of the eccentric shaft is mounted on the pump shell through the bearing. Through the arrangement of this structure, the two bearings function to support the rotation of the pump main shaft and the eccentric shaft.

In the above-mentioned pump unit for a miniature cleaning machine, the plunger comprises a plunger sleeve and a plunger plug connected to the plunger sleeve, an upper portion of the reset spring is sleeved on a peripheral face of the plunger plug, and an upper end of the reset spring abuts against a lower end face of the plunger sleeve. Through the arrangement of this structure, each of the reset springs providing reset force for the plunger is arranged in the plunger, so that the reset spring is smaller in size, low in structural strength, and prone to fatigue, leading to a lower service life of the reset spring; through the arrangement of this structure, the reset spring is arranged outside of the plunger, so that the reset spring is relatively larger in size, has better strength and elasticity, and it is not prone to fatigue, thus the service life of the reset spring is improved.

In the above-mentioned pump unit for a miniature cleaning machine, the pump shell comprises a water inlet, a water inlet cavity in communication with the water inlet, a water outlet and a water outlet cavity in communication with the water outlet, a water inlet one-way valve is arranged in the water inlet cavity, a water outlet one-way valve is arranged in the water outlet cavity, when the plunger moves downward, the water inlet one-way valve is closed and the water outlet one-way valve opens; when the plunger moves upward, the water inlet one-way valve opens and the water outlet one-way valve is closed.

In the above-mentioned pump unit for a miniature cleaning machine, the pump unit further comprises a water inlet switch arranged on the pump shell, and the water inlet switch can control the water inlet to be in communication with or not in communication with the water inlet cavity. Through the arrangement of this structure, when using the miniature cleaning machine, an operator needs to first control the water inlet switch to make the water inlet in communication with the water inlet cavity, then water can enter the water inlet cavity from the water inlet, thus a safer use of the miniature cleaning machine can be achieved.

In the above-mentioned pump unit for a miniature cleaning machine, the water inlet switch comprises a valve seat fixed on the pump shell, a valve core rod running through the pump shell and a spring arranged between the valve seat and the valve core rod, a water passage is formed between the water inlet and the water inlet cavity, and the valve core rod can block or open the water passage. Through the arrangement of this structure, the user can press the valve core rod to make the valve core rod slide along its axial direction against the acting force of the spring. Then the water passage opens, and water can flow into the water inlet cavity from the water inlet; after the valve core rod is loosened, the valve core rod is reset under the force of the spring and blocks the water passage.

In the above-mentioned pump unit for a miniature cleaning machine, the pump unit further comprises a flexible high-pressure hose, a quick-plug connector is arranged on each of two ends of the flexible high-pressure hose, respectively, the quick-plug connector on one end of the flexible high-pressure hose is connected to the water outlet in a plug connection manner. In the prior art, a high-pressure spray nozzle is mounted on a housing. The pump unit is fitted on the housing. Since the flexible high-pressure hose is connected to the water outlet of the plunger pump in the structure, it allows the quick-plug connector on an outer end of the flexible high-pressure hose to be connected to the high-pressure jet nozzle in a plug connection manner, and the water outlet of the plunger pump can be in communication with the high-pressure jet nozzle. The flexible high-pressure hose has certain deformation and torsion properties. The flexible high-pressure hose can be bent or eluded accordingly in accordance with an internal shape of the housing and configuration thereof. In this way, a complex waterway layout between the water outlet of the plunger pump and the high-pressure jet nozzle can be arranged as desired, so that the pump unit can be mounted on a variety of different housings, the universality and the convenience of assembly of the pump unit are improved.

In the above-mentioned pump unit for a miniature cleaning machine, the flexible high-pressure hose is made of rubber or PE materials, and a braided layer is formed inside the flexible high-pressure hose. Through the arrangement of this structure, the presence of the braided layer improves a structural strength of the flexible high-pressure hose and improves its bearing performance.

In the above-mentioned pump unit for a miniature cleaning machine, the pump main shaft is integrally formed with the eccentric shaft. Through the arrangement of this structure, the pump main shaft and the eccentric shaft are integrally formed as a camshaft. In this way, the camshaft can be completed in a one-time processing process, so that processing precision of the camshaft is high, and the difficulty in processing the camshaft is reduced.

When compared with the prior art, the pump unit for a miniature cleaning machine provided in the invention has the following advantages: the structure in this invention does not have the needle roller bearing arranged on the plunger, instead, the eccentric shaft is sleeved with the ball bearing, and the peripheral face of the ball bearing is directly attached to the upper end face of the plunger. Since the ball bearing can bear a larger load than the needle roller bearing does, the ball bearing is not prone to be damaged, which in turn extends the service life of the bearing, and reduces the usage costs of the pump unit; on the other hand, the ball bearing is smaller in size and lower in cost than the cam, and arrangement of the needle roller bearing on the plunger is eliminated, which further reduces the manufacturing cost of the pump unit.

In the accompanying drawings: 1, motor; 2, pump shell; 20, water inlet; 21, water inlet cavity; 22, water outlet; 23, water outlet cavity; 24, water passage; 3, plunger; 30, plunger sleeve; 31, plunger plug; 4, transmission assembly; 40, pump main shaft; 41, eccentric shaft; 42, ball bearing; 5, reset spring; 6, bearing; 7, water inlet one-way valve; 8, water outlet one-way valve; 9. water inlet switch; 90. valve seat; 91. valve core rod; 92. spring; 10. flexible high-pressure hose; 11. quick-plug connector.

DETAILED DESCRIPTION

Particular embodiments are set forth hereinafter. The present invention will be described in the particular embodiments with reference to the accompanying drawings, but the invention is not limited thereto.

Example 1

Figure 1:
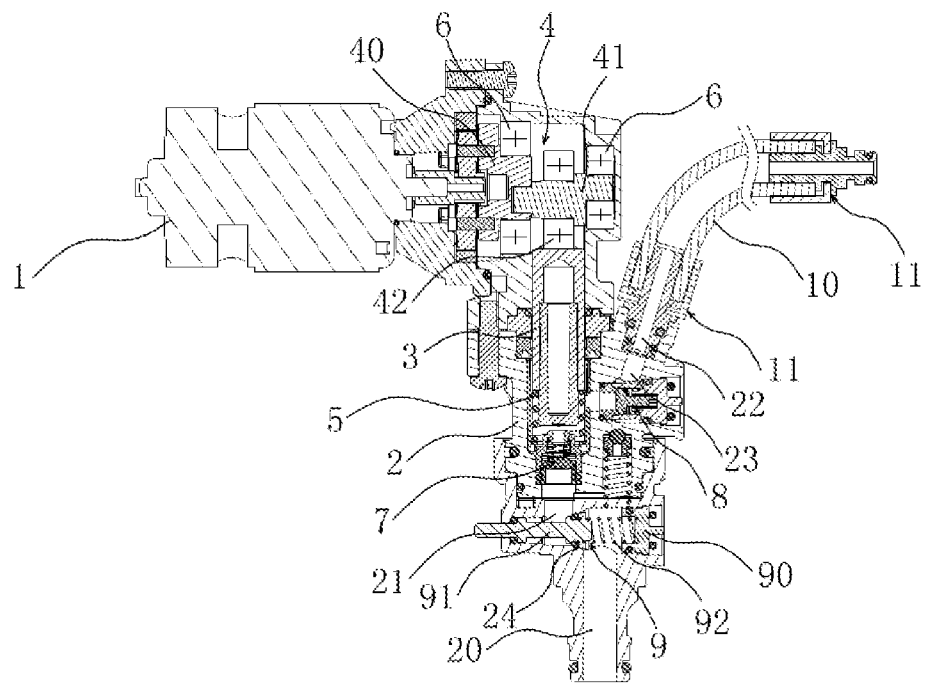
FIG. 1 is a schematic cross-sectional view showing a structure of the invention.
Figure 3:
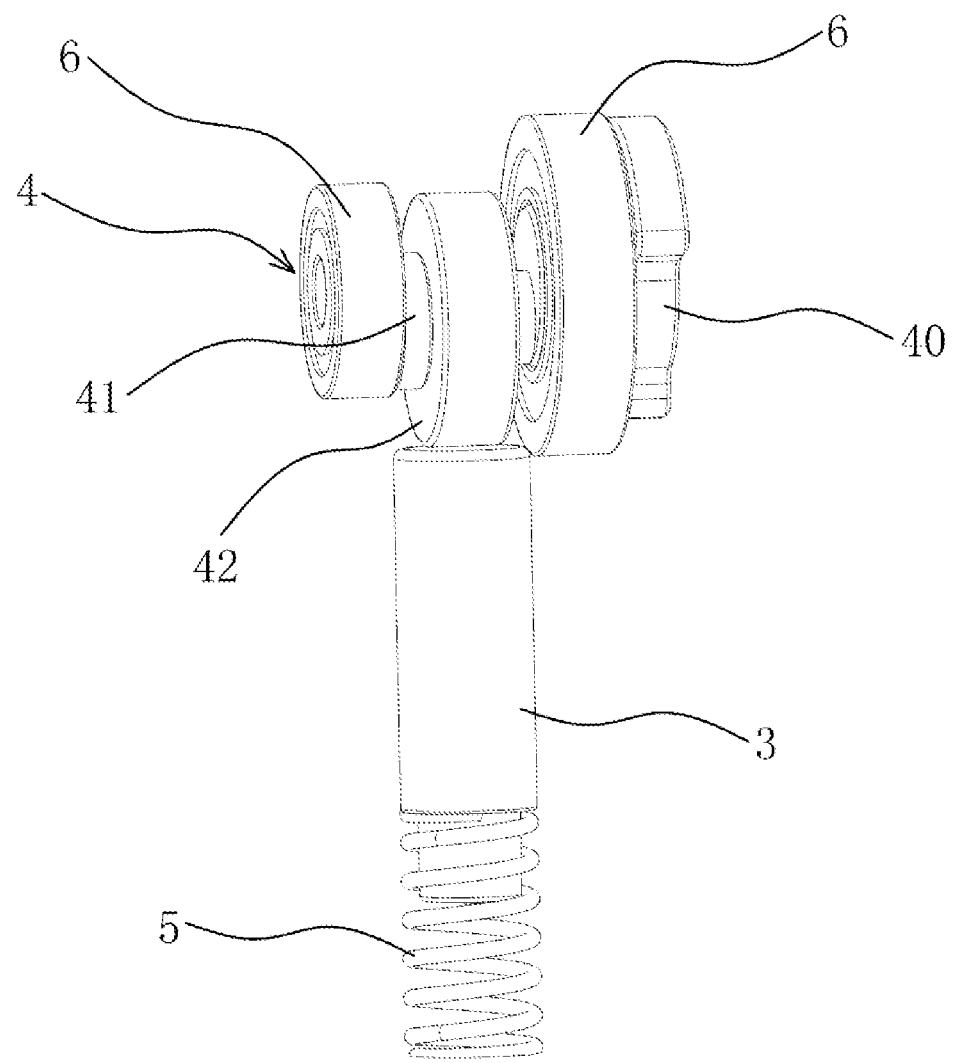
FIG. 3 is schematic perspective view showing a structure of a part of the invention.
Figure 4:
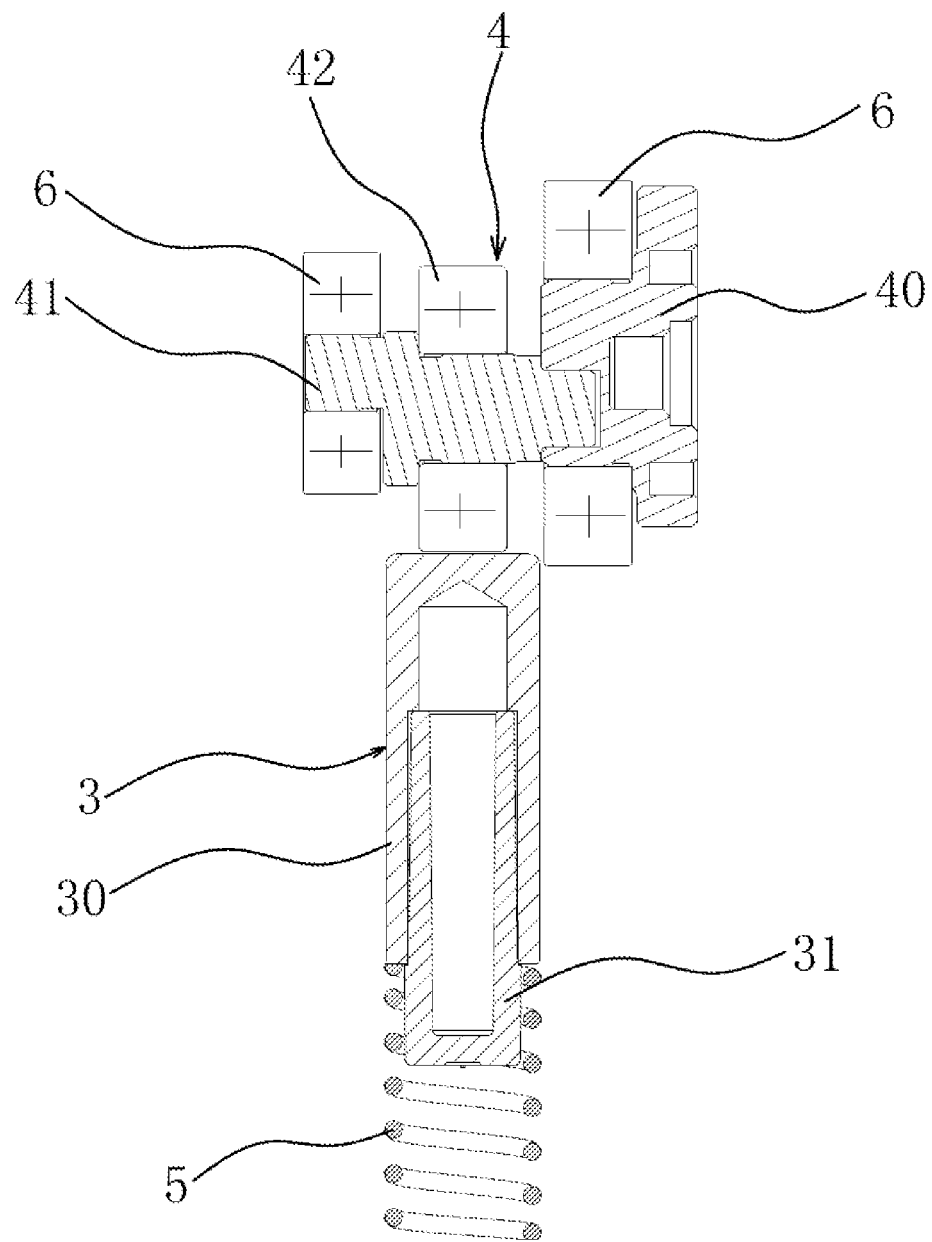
FIG. 4 is schematic cross-sectional view showing a structure of a part of the invention.
Figure 5:
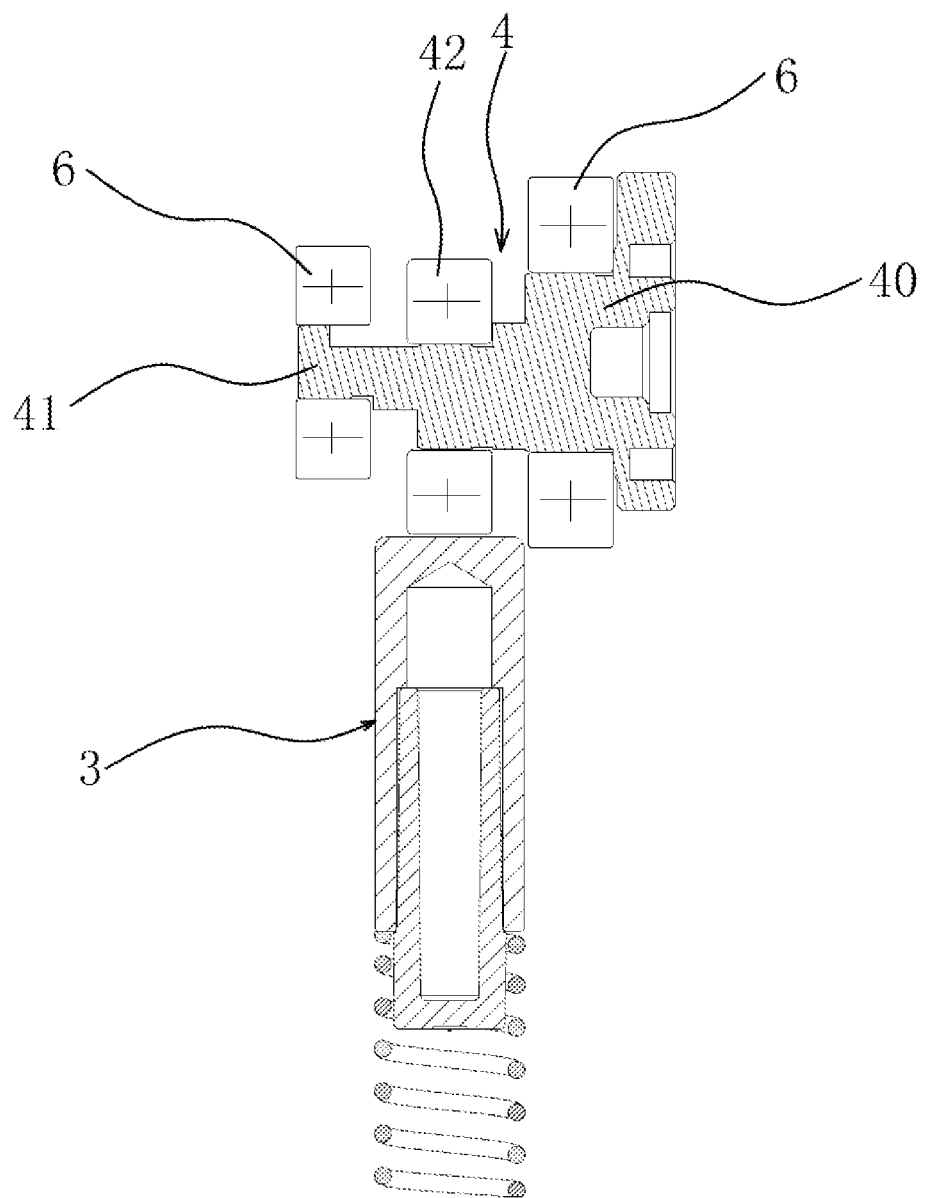
FIG. 5 is schematic cross-sectional view showing a structure of a part of Example 2.
Figure 6:
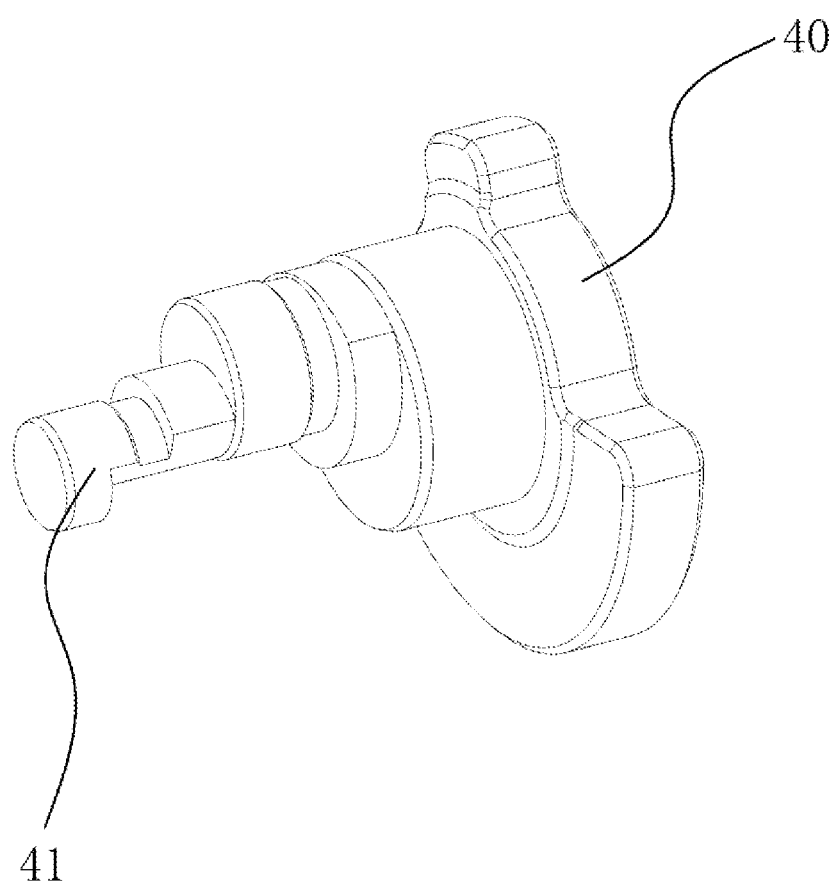
FIG. 6 is schematic perspective view showing a structure of a pump main shaft and an eccentric shaft being integrally formed as one piece of Example 2.

As shown in FIGS. 1, 3 and 4, a pump unit for a miniature cleaning machine comprises a motor 1, a pump shell 2, a plunger 3 and a transmission assembly 4, the plunger 3 and the transmission assembly 4 are arranged in the pump shell 2, a reset spring 5 enabling the plunger 3 to always have the upward moving trend is arranged in the pump shell 2, wherein the transmission assembly 4 comprises a pump main shaft 40, an eccentric shaft 41 and a ball bearing 42, one end of the pump main shaft 40 is in transmission connection with the motor 1, and the other end of the pump main shaft 40 is connected to the pump shell 2 through a bearing 6, and the other end of the pump main shaft 40 is in transmission connection with one end of the eccentric shaft 41, the other end of the eccentric shaft 41 is connected to the pump shell 2 through the bearing 6, the eccentric shaft 41 is sleeved with the ball bearing 42, and a peripheral face of the ball bearing 42 is attached to an upper end face of the plunger 3. When the pump unit operates, the motor 1 drives the pump main shaft 40 to rotate, so as to drive the eccentric shaft 41 to rotate. Then the rotation of the eccentric shaft 41 makes the ball bearing 42 rotate. The peripheral face of the ball bearing 42 is in rolling friction with the upper end face of the plunger 3, so that the plunger 3 can reciprocate up and down. The structure in this invention does not have the needle roller bearing arranged on the plunger 3, instead, the eccentric shaft 41 is sleeved with the ball bearing 42, and the peripheral face of the ball bearing 42 is directly attached to the upper end face of the plunger 3. Since the ball bearing 42 can bear a larger load than the needle roller bearing does, the ball bearing is not prone to be damaged, which in turn extends the service life of the bearing, and reduces the usage costs of the pump unit; on the other hand, the ball bearing 42 is smaller in size and lower in cost than the cam, and arrangement of the needle roller bearing on the plunger 3 is eliminated, which further reduces the manufacturing cost of the pump unit.

As shown in FIGS. 3 and 4, the plunger 3 comprises a plunger sleeve 30 and a plunger plug 31 connected to the plunger sleeve 30, an upper portion of the reset spring 5 is sleeved on a peripheral face of the plunger plug 31, and an upper end of the reset spring 5 abuts against a lower end face of the plunger sleeve 30. The reset spring 5 is arranged outside of the plunger 3, so that the reset spring 5 is relatively larger in size, has better strength and elasticity, and it is not prone to fatigue, thus the service life of the reset spring 5 is improved.

As shown in FIG. 1, the pump shell 2 comprises a water inlet 20, a water inlet cavity 21 in communication with the water inlet 20, a water outlet 22 and a water outlet cavity 23 in communication with the water outlet 22, a water inlet one-way valve 7 is arranged in the water inlet cavity 21, a water outlet one-way valve 8 is arranged in the water outlet cavity 23, when the plunger 3 moves downward, the water inlet one-way valve 7 is closed and the water outlet one-way valve 8 opens; when the plunger 3 moves upward, the water inlet one-way valve 7 opens and the water outlet one-way valve 8 is closed.

As shown in FIG. 1, the pump unit further comprises a water inlet switch 9 arranged on the pump shell 2, and the water inlet switch 9 can control the water inlet 20 to be in communication with or not in communication with the water inlet cavity 9. The water inlet switch 9 comprises a valve seat 90 fixed on the pump shell 2, a valve core rod 91 running through the pump shell 2 and a spring 92 arranged between the valve seat 90 and the valve core rod 91, a water passage 24 is formed between the water inlet 20 and the water inlet cavity 21, and the valve core rod 91 can block or open the water passage 24. The user can press the valve core rod 91 to make the valve core rod 91 slide along its axial direction against the acting force of the spring 92. Then the water passage 24 opens, and water can flow into the water inlet cavity 21 from the water inlet 20; after the valve core rod 91 is loosened, the valve core rod 91 is reset under the force of the spring 92 and blocks the water passage 24.

Figure 2:
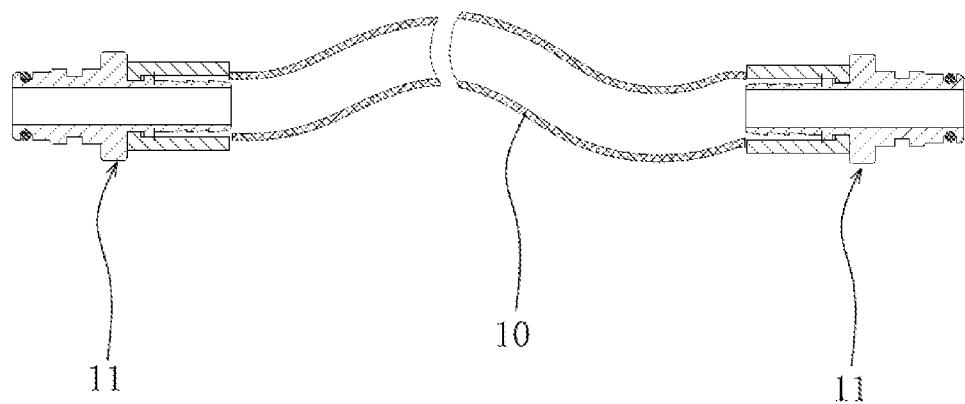
FIG. 2 is a schematic cross-sectional view showing a structure of a flexible high-pressure hose of the invention.

As shown in FIG. 2, the pump unit further comprises a flexible high-pressure hose 10, a quick-plug connector 11 is arranged on each of two ends of the flexible high-pressure hose 10, respectively, the quick-plug connector 11 on one end of the flexible high-pressure hose 10 is connected to the water outlet 22 in a plug connection manner. The flexible high-pressure hose 10 is made of rubber or PE materials, and a braided layer is formed inside the flexible high-pressure hose 10.

Example 2

This example is substantially the same as Example, and one difference between the example and Example 1 is that the pump main shaft 40 is integrally formed with the eccentric shaft 41. The pump main shaft 40 and the eccentric shaft 41 are integrally formed as a camshaft. In this way, the camshaft can be completed in a one-time processing process, so that processing precision of the camshaft is high, and the difficulty in processing the camshaft is reduced.

The embodiments illustrated herein are merely exemplary of the spirit of the invention. Those skilled in the art, to which the invention belongs, are allowed to make various changes to the embodiments or supplement the embodiments or make alternatives in a similar way, it should be understood, however, that all of those will not deviate from the spirit of the invention or go beyond the scope of the claims as appended.

What is claimed is:

1. A pump unit for a miniature cleaning machine, comprising:
a motor (1), a pump shell (2), a plunger (3) and a transmission assembly (4), the plunger (3) and the transmission assembly (4) are arranged in the pump shell (2), a reset spring (5) enabling the plunger (3) to always have the upward moving trend is arranged in the pump shell (2), wherein the transmission assembly (4) comprises a pump main shaft (40), an eccentric shaft (41) and a ball bearing (42), one end of the pump main shaft (40) is in transmission connection with the motor (1), and the other end of the pump main shaft (40) is in transmission connection with one end of the eccentric shaft (41), the other end of the eccentric shaft (41) is connected to the pump shell (2), the eccentric shaft (41) is sleeved with the ball bearing (42), and a peripheral face of the ball bearing (42) is attached to an upper end face of the plunger (3),
wherein the plunger (3) comprises a plunger sleeve (30) and a plunger plug (31) connected to the plunger sleeve (30), an upper portion of the reset spring (5) is sleeved on a peripheral face of the plunger plug (31), and an upper end of the reset spring (5) abuts against a lower end face of the plunger sleeve (30).

2. The pump unit for a miniature cleaning machine of claim 1, wherein the pump main shaft (40) is mounted through a bearing (6), the eccentric shaft (41) being mounted on the pump shell (2) through the bearing (6).

3. A pump unit for a miniature cleaning machine, comprising:
a motor (1), a pump shell (2), a plunger (3) and a transmission assembly (4), the plunger (3) and the transmission assembly (4) are arranged in the pump shell (2), a reset spring (5) enabling the plunger (3) to always have the upward moving trend is arranged in the pump shell (2), wherein the transmission assembly (4) comprises a pump main shaft (40), an eccentric shaft (41) and a ball bearing (42), one end of the pump main shaft (40) is in transmission connection with the motor (1), and the other end of the pump main shaft (40) is in transmission connection with one end of the eccentric shaft (41), the other end of the eccentric shaft (41) is connected to the pump shell (2), the eccentric shaft (41) is sleeved with the ball bearing (42), and a peripheral face of the ball bearing (42) is attached to an upper end face of the plunger (3),
wherein the pump shell (2) comprises a water inlet (20), a water inlet cavity (21) in communication with the water inlet (20), a water outlet (22) and a water outlet cavity (23) in communication with the water outlet (22), a water inlet one-way valve (7) is arranged in the water inlet cavity (21), a water outlet one-way valve (8) is arranged in the water outlet cavity (23), when the plunger (3) moves downward, the water inlet one-way valve (7) is closed and the water outlet one-way valve (8) opens; when the plunger (3) moves upward, the water inlet one-way valve (7) opens and the water outlet one-way valve (8) is closed, and wherein the pump unit further comprises a water inlet switch (9) arranged on the pump shell (2), and the water inlet switch (9) can control the water inlet (20) to be in communication with or not in communication with the water inlet cavity (21).

4. The pump unit for a miniature cleaning machine of claim 3, wherein the water inlet switch (9) comprises a valve seat (90) fixed on the pump shell (2), a valve core rod (91) running through the pump shell (2) and a spring (92) arranged between the valve seat (90) and the valve core rod (91), a water passage (24) is formed between the water inlet (20) and the water inlet cavity (21), and the valve core rod (91) can block or open the water passage (24).

5. The pump unit for a miniature cleaning machine of claim 3, wherein the pump unit further comprises a flexible high-pressure hose (10), a quick-plug connector (11) is arranged on each of two ends of the flexible high-pressure hose (10), respectively, the quick-plug connector (11) on one end of the flexible high-pressure hose (10) is connected to the water outlet (22) in a plug connection manner.

6. The pump unit for a miniature cleaning machine of claim 5, wherein the flexible high-pressure hose (10) is made of rubber or PE materials, and a braided layer is formed inside the flexible high-pressure hose (10).

7. The pump unit for a miniature cleaning machine of claim 1, wherein the pump main shaft (40) is integrally formed with the eccentric shaft (41).

8. The pump unit for a miniature cleaning machine of claim 3, wherein the pump main shaft (40) is integrally formed with the eccentric shaft (41).

* * * * *